Jan. 11, 1944.   R. MAYNE   2,338,818
SPROCKET WHEEL ASSEMBLY
Filed Aug. 13, 1941
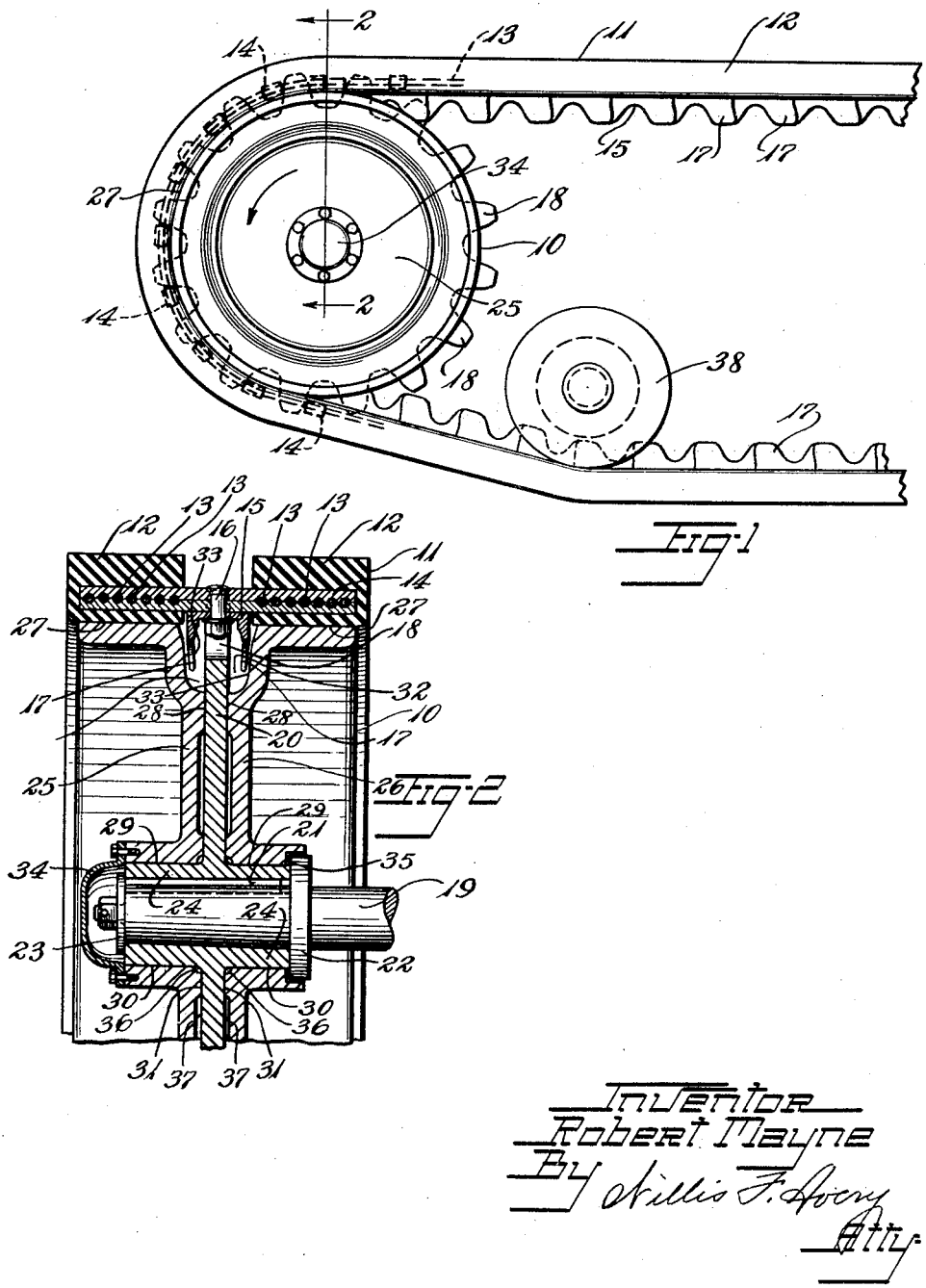
Inventor
Robert Mayne
By Willis F. Avery
Atty.

Patented Jan. 11, 1944

2,338,818

UNITED STATES PATENT OFFICE 2,338,818

SPROCKET WHEEL ASSEMBLY

Robert Mayne, Akron, Ohio, assignor to the B. F. Goodrich Company, New York, N. Y., a corporation of New York Application August 13, 1941, Serial No. 406,636

7 Claims. (Cl. 305—6)

This invention relates to endless track assemblies for vehicles of the self-laying track type, and especiailly to driving wheels for such track assemblies.

In endless track assemblies heretofore the difficulties have sometimes been encountered of improper meshing of the sprocket teeth of the driving wheel with the driven members of the track, of a tendency for the track to climb with respect to the sprocket wheel, of excessive localized stresses on the sprocket teeth and on the driven members, and of excessive wear at the contacting faces of the track and the supporting flanges fixed to the sprocket wheel. Such difficulties have resulted from the difference between the pitch diameter of the sprocket teeth and the diameter of the sprocket teeth and the diameter of the face of the wheel contacting the inside surface of the track as when the effective diameter of the wheel has been altered as in the case when clay, ice or other foreign matter has entered between the wheel and the track. Such difficulties may result also from other causes, such as, wear and variations from exact and uniform dimensional relationship.

The chief objects of the invention are to provide for avoiding the foregoing difficulties; to provide a durable track assembly while reducing or eliminating the possibility of sliding movement between track and supporting means, and consequent excessive wear of the track; to provide for a reduction of localized stresses on the teeth of the driving sprocket and on the cleats and elsewhere in the assembly and at the same time to maintain effective driving action; and to provide for economy and convenience of manufacture and assembly.

A more specific object is to provide driving means for a self-laying track having a minimum or relative sliding movement of the supporting portion of the driving means with respect to the track.

These and further objects will be apparent from the following description, reference being had to the accompanying drawing in which:

Fig. 1 is a side elevation of a portion of track assembly.

Fig. 2 is a section on an enlarged scale taken along the line 2—2 of Fig. 1 and showing details of construction of a sprocket wheel assembly constructed in accordance with and embodying the invention.

For the purpose of illustration, there is shown in the drawing an embodiment of the invention in which a sprocket wheel, indicated generally at 10 in the drawing is in assembly with an endless track 11 of the type disclosed in my prior U. S. Patent No. 2,107,490, granted February 8, 1938. The track of the illustrative embodiment comprises a pair of laterally spaced tread elements 12, 12, preferably of rubber or other rubber-like material and a plurality of laterally spaced-apart tension elements which may be in the form of parallel cables 13, 13 of metal wire or other suitable reinforcing material. Spaced metal cross-bars 14, 14 are provided to add transverse rigidity and strength to the structure and to support the cables 13, 13 in a manner to transmit driving stress from the sprocket wheel 10 to the track and the cables extend through apertures in the cross-bars, and preferably are connected therewith solely by intervening rubber-material, as described in said patent.

Removable wear members 15, 15 fixed to the track 10 as by bolts 16 at the cross-bars 14, 14 are each adapted to extend past the next adjacent wear member in intercalated sliding engagement, and have guide plates 17, 17 to receive sprocket teeth 18, 18 of the wheel 10 therebetween in sliding engagement. The sprocket may engage the cross-bars directly or it may transmit the driving force to the bars through engagement with portions of the wear members.

The driving wheel is mounted on an axle 19 and comprises a sprocket 20 which may be keyed to the axle 19, as shown at 21, and is held against axial movement as by an end restraining flange 22 and end washer 23 on the axle 19 at the ends of axially extending flange portions 24, 24 of the sprocket 20, as shown, but may be fixed to the axle in any other suitable manner as desired. A pair of track-engaging rim members 25 and 26 are mounted on the axially extending flange portions 24, 24 of the sprocket 20. The rim members 25 and 26 are mounted to be slidably rotatable with respect to the axle 19 and sprocket 20 when differences in the extent of movement between portions of the track 11 contacted by the teeth 18, 18 of the sprocket 20 and the extent of movement of the track 11 at flange contacting surface 27, 27 require relative movement between the flange members 25 and 26 and the sprocket 20, which is taken by relative sliding movement at the surfaces 28, 28, 29, 29, 30, 30 and 31, 31.

The track-supporting flange members 25 and 26 are formed with annular grooves 32, 32 for accommodating guide plates 17, 17 of the wear members 15, 15, the guide plates being adapted to bear against walls 33, 33 of the grooved portions 32, 32 to prevent undesirable lateral displacement of the track 11 with respect to the sprocket wheel 10.

A suitable lubricant may be introduced at the axle assembly to the end of reducing friction between the relatively movable parts. A cover plate 34 is desirable over the end of the axle assembly and fixed for rotation with a supporting flange member 25 to prevent the entrance of foreign matter and to retain the lubricant. A sealing ring 35 is also desirable between the end-restraining member 23 and the supporting flange 26 contiguous therewith to exclude foreign matter and hold a lubricant between the relatively movable parts of the axle assembly of the wheel 10.

Relief of the material at the corners 36, 36 of the supporting flange members 25 and 26, and relief of the material also at 37, 37 in the radial extent of the flange members may be provided as shown in Fig. 2 of the drawing and illustrates a method by which the designer may control the amount of frictional resistance as desired between the supporting flange members 25 and 26 and the sprocket 20, and such openings may also be useful to accommodate a lubricant if desired.

A number of bogie wheels or guide pulleys are provided to support and guide the track. One of such guide wheels is shown at 38 in Fig. 1 of the drawing.

In use, the teeth 18, 18 of the sprocket 20 are driven by the axle 19 from the power unit of the track-laying vehicle, and engage the track 10 to drive the same. The sprocket wheel assembly of the invention permits movement of the supporting flange members 25 and 26 in non-sliding contact with the inside surfaces of the track bands 12, 12, the relative movement between sprocket and supports being transferred to the surfaces 28, 28, 29, 29, 30, 30 and 31, 31 between metallic parts, which surfaces not only afford greater wear-resistance per unit area, but also may be more extensive and may be lubricated to reduce the frictional resistance of the contact.

The construction provides that in the event clay, ice or other foreign matter enters between the wheel and the track, the change produced by the presence of such foreign matter in the effective diameter of the sprocket wheel will be accommodated by the relative rotation permitted of the track-engaging rim members so that the tendency of the track to climb with respect to the sprocket teeth and excessive localized stresses and wear of the parts will be eliminated or reduced.

Variations may be made without departing from the scope of the invention as it is defined by the following claims.

I claim:

1. A wheel assembly for cooperation with an endless track comprising a torque-transmitting sprocket member rotatable about an axis, and a track-supporting member mounted adjacent said torque-transmitting member for rotation about said axis and for rotational movement relative to the first said member, and having a portion adapted to support the track directly.

2. A wheel assembly for cooperation with an endless track comprising a torque-transmitting sprocket member rotatable about an axis, and a track-supporting member mounted adjacent said torque-transmitting member for rotation about said axis and for rotational movement relative to the first said member and in sliding contact therewith, and having a portion adapted to support the track directly.

3. A sprocket wheel assembly for cooperation with an endless track comprising a torque-transmitting sprocket member mounted for rotation about an axis, and adapted for engagement of its teeth with spaced-apart elements of a meshing track structure, and a track-supporting member mounted adjacent the sprocket member for rotation about said axis in contact with said track structure and for rotational movement relative to said sprocket member.

4. A wheel assembly for cooperation with an endless track comprising a torque-transmitting sprocket member mounted for rotation about an axis, and a pair of track-supporting members mounted one at each side of said sprocket member and adjacent thereto for rotation about said axis and for sliding rotational movement relative to said sprocket member.

5. A wheel assembly comprising an axle, a torque-transmitting sprocket member mounted on said axle, said sprocket member having axially-extending portions at the axle, and a pair of load-supporting members disposed one at each side of said sprocket member and mounted on said portions adjacent said sprocket member for rotation about said axle and for rotational movement relative to said sprocket member.

6. A sprocket wheel assembly for an endless track, said wheel comprising a pair of load-supporting members each mounted for free rotation about an axis, and a sprocket member mounted between said pair of supporting members for driving said track, said sprocket member having axially extending flange portions comprising surfaces for mounting said supporting members in sliding relation therewith, said supporting member being mounted for sliding contact also with a radially disposed face of said sprocket member.

7. A sprocket wheel assembly for an endless track, said wheel comprising a pair of load-supporting members each mounted for free rotation about an axis, and having a track-contacting rim portion, a sprocket member for driving said track by engagement of the teeth of the sprocket with spaced-apart elements of said track, said sprocket member being mounted between said supporting members for rotational movement relative thereto and in sliding contact therewith and having axially-extending flange portions, said flange portions having surfaces for mounting said supporting members in sliding relation therewith.

ROBERT MAYNE.